United States Patent Office 3,101,191
Patented Aug. 20, 1963

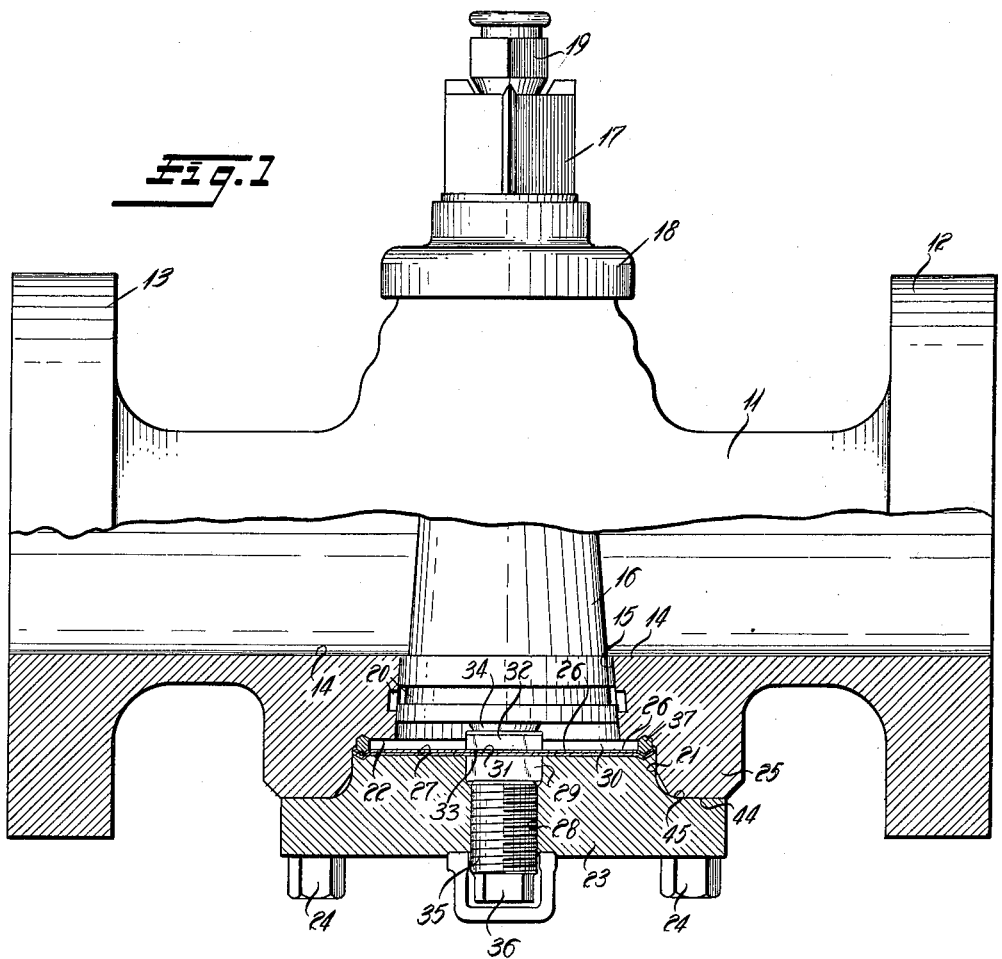
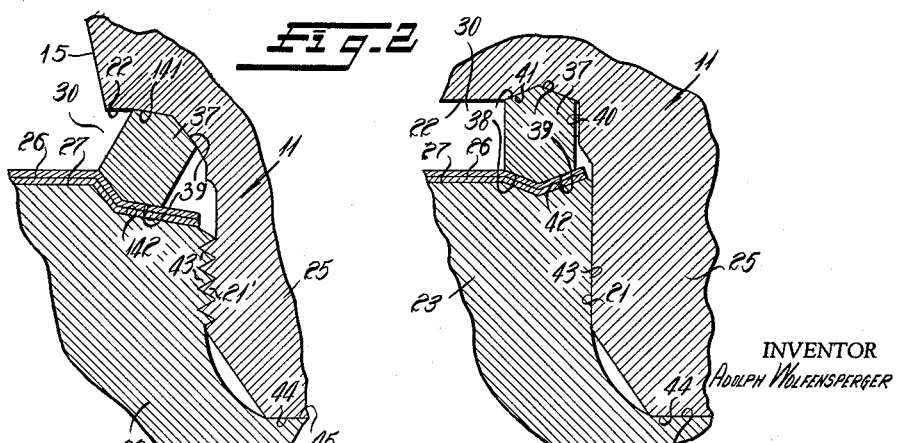

3,101,191
FLUID PRESSURE TIGHT JOINT
Adolph Wolfensperger, Orinda, Calif., assignor to Rockwell Manufacturing Company, Pittsburgh, Pa., a corporation of Pennsylvania
Filed Dec. 9, 1959, Ser. No. 858,499
3 Claims. (Cl. 251—309)

This invention relates to plug valve body or like container joint sealing to prevent loss of fluid under high internal pressures and as applied to a valve is particularly directed to the provision of a novel body bore cover seal.

In its preferred embodiment which is illustrative but not essentially restrictive of the invention a relatively heavy metal cover is rigidly secured as by bolts across the open end of a valve plug seating bore, and a rigid metal seal ring is held under axial pressure between the cover and the valve body, but this pressure is controlled and limited by coacting abutments on the body and cover so as to permit adequate prestressing of the ring as the bolts are drawn tight but prevent crushing of ring.

It is therefore a major object of the invention to provide in a seal joint such as the cover to body seal joint in a plug valve a novel arrangement for exerting adequate pressure axially on a rigid seal ring seated in opposed surface grooves while at the same time positively preventing the application of sufficient pressure to crush the ring.

Another object of the invention is to provide a novel plug valve structure wherein a cover is rigidly secured across the end of a plug seating bore, a rigid seal ring is disposed in opposite annular grooves in the cover and a body shoulder, and cover to body abutments are provided to control the maximum pressure applied to the ring by securing the cover over the bore.

Further objects of the invention will appear as the description proceeds in connection with the appended claims and the annexed drawings wherein:

FIGURE 1 is a side elevation partly in section showing the invention as applied to a plug valve;

FIGURE 2 is an enlarged fragmentary section showing the seal of FIGURE 1 in its essential aspects; and FIGURE 3 is a similar enlarged section showing the same seal in different location than in FIGURES 1 and 2.

The plug valve to which the invention is applied in the preferred embodiment comprises a metal body 11 having end flanges 12 and 13 for connecting to a pipe line and a through passage 14 that intersects at right angles a conical bore 15 in which is rotatably mounted a tapered metal plug 16. Plug 16 has a through port shown as aligned with passage 14 to illustrate open valve position, and it may be rotated 90° to close passage 14.

At its upper end plug 16 has an operating stem 17 projecting through a seal 18 on the body and by which the plug is rotated between open and closed positions. A suitable lubricant screw 19 is provided on the end of the stem for introducing lubricant through suitable plug and bore surface passages to grooves 20 in the conical seating surfaces of the plug in bore 15.

So far the foregoing structure is conventional and may be essentially the same as shown in Scherer Patent No. 2,525,831, issued October 17, 1950, to which reference is made for further detail.

Beyond the larger end of the plug bore 15 is enlarged in diameter at 21 and a flat radial shoulder 22 is formed normal to the plug axis and facing outwardly. This end of the bore is closed by a relatively heavy metal cover 23 rigidly secured to the body as by bolts or studs 24 entering the annular bottom body boss 25 surrounding shoulder 22.

A disc or diaphragm 26 which may be flexible fluid impervious material such as stainless steel overlies the inner flat cover surface 27. This diaphragm is preferably laminated stainless steel and asbestos surface bonded together, and it is inert with respect to the line fluids that pass through passage 14.

A threaded aperture 28 is centrally formed in cover 23 and it terminates inwardly in a pressure block 29 having a smooth face 31 bearing on disc 26. Another pressure block 32 has a lower flat face 33 engaging the disc 26 on the opposite side from block 29, and the upper end of block 32 is socketed to receive a spherical ball 34 that enters a centered socket (not shown) in the lower end of plug 16. This structure is essentially old as shown in said Scherer patent, and a threaded screw 35 having a wrench-fitting head 36 engages the bottom of block 29. Block 29 may be integral with screw 35. Rotation of screw 35 transmits positive pressure through flexible diaphragm 26 to plug 16 to establish the seating pressure of plug 16 in bore 15.

A solid hard metal seal ring 37 is provided between shoulder 22 and the cover. This ring which as shown in FIGURE 2 is of essentially hexagonal cross section in this embodiment is preferably suitably oblong being thinner than the dimension axially (of the plug) and is formed on upper and lower peripheries with apex forming inclined surfaces 38, 39. An annular recess 41 is formed in shoulder 22 shaped to receive the upper part of ring 37, and a similarly axially aligned recess 42 is formed in cover surface 27.

The outer periphery of diaphragm 26 extends over recess 42, and when the cover 23 is in place the flexible diaphragm is deformed all around its periphery under the ring clamping pressure as shown in FIGURE 2.

Cover 23 is essentially piloted into the body by a cylindrical surface 43 fitting into cylindrical bore section 21. The sides of ring 37 are parallel to each other and the plug axis in the assembly. If desired recesses 41, 42 and the upper and lower apices at 38, 39 may be rounded somewhat instead of more or less pointed as shown.

Ring 37 is of uniform cross section throughout and preferably made of a relatively soft low carbon steel having a yield point lower than the yield point of the material used in body 11 and which is resistant to considerable axial clamping pressure without appreciable deformation. For example the body 11 may be of steel having a yield point of about 36,000–40,000 p.s.i. while the yield point of the ring steel may be about 25,000–30,000 p.s.i. It has been found however that the tremendous force exerted by tightening heavy cover bolts 24 in an attempt to exert sufficient axial pressure on the ring 37 to seal under very high line pressures may result in crushing of seal ring 37 which would of course destroy the seal. On the other hand the ring material must be under preload and soft enough that it can be compressed up to about .016″ without being crushed, to take up tolerances in the parts.

In order to control and limit the axial forces exerted on seal ring 37, the peripheral ends of boss 25 and cover 23 are formed with engaged flat smooth abutment surfaces 44 and 45 which lie in a plane at right angles to the plug axis. Surfaces 44 and 45 are accurately located axially of the bore so that when bolts 24 are drawn fully tight until surfaces 44 and 45 are engaged the ring 37 is controllably prestressed axially in the assembly. The amount of this prestress is controlled by the relative locations of the engaged annular surfaces 44 and 45, and this is the most important feature of the invention, and the tightened cover clamps the ring onto the body with sufficient force to provide an adequately tight pressure seal fit to prevent leakage through the joint at pressures up to certain maximum without becoming so excessive as to crush the ring.

It will be appreciated that the ultimate pressure tight nature of this seal does not depend wholly on the degree of axial force exerted on ring 37 by tightening the cover bolts, but also is augmented by the action of line pressure acting from the interior of space 30 to outwardly expand ring 37 into wedging engagement between the cover and body, so that under operating conditions the seal between cover 23 and body 11 becomes more fluid pressure tight as internal pressures increase. Actually the illustrated axial compression of the joint is sufficient to seal up to relatively high pressures, but as the internal pressures become so high that they might be expected to leak through the joint under the existing degree of ring compression the high pressures by this time join in to contribute to the seal by exerting radially outward forces on the ring. In the FIGURE 2 embodiment internal pressure urges the ring into pressing sealing contact at the surfaces 39. The surrounding cylindrical bore surface 40 acts as a pilot surface for the ring. In FIGURE 3 the fluid pressure force components also increases the seating pressure of the ring in both recesses.

FIGURE 3 shows essentially the same structure except that the cover 23 is threaded at 43' to engage body threads 21' and recesses 141 and 142 on the body and cover respectively, instead of axially facing as in FIGURE 2, are disposed to face each other at an angle, preferably about 45°, with respect to the plug axis, the angle being convergent in the direction of the large end of the plug bore. The purpose of this arrangement is to locate the seal ring as close as possible to the tapered bore 15 without risking deformation of the body in that region. This reduces the load on the threads or the studs where used.

In this embodiment when the cover is drawn tight, by bolts or threads, the seal ring 37 which is shaped to extend between recesses 141 and 142 is axially compressed just sufficiently to establish the required pressure responsive seal relationship by the time surfaces 44 and 45 engage. The seal structure of FIGURE 2 has been found satisfactory in 12 and 16 inch lines at pressures up to 6000 pounds per square inch. The embodiment of FIGURE 3 has been tested successfully in a 3 inch line at pressures up to 5000 pounds per square inch.

In the embodiment of FIGURE 3 the tilted cross-section axis of the ring insures that the forces clamping the ring 37 are directed toward the inner metal parts of the body and cover while at the same time the ring surfaces engaging the body and the cover are located radially a sufficient distance away from the peripheral edges of bore 15 and cover 23 that neither the bore nor the cover will be deformed out of shape in those regions due to clamping pressures. This embodiment enables the cover receiving bore of the body to be smaller in diameter for the same pressures than the FIGURE 2 arrangement.

Disc 26, being pressure impervious, seals off bore 28 while at the same time transmitting the heavy plug seating pressure.

The invention may be equally well applied to other valve structures for example where the bottom cover is threaded into the larger end of the bore as in Nordstrom Patent No. 2,398,444 issued April 16, 1946.

The shape and dimensions of the ring 37 and associated grooves may correspond to those of A.P.I. Standard No. 5–G–3–1937 or B16e, 1939 for pipe line ring joints.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a metal to metal joint adapted to seal under high internal pressures, a pair of metal members adapted to contain a fluid pressure medium and formed with opposed annular surface recesses, said recesses being of substantial V-shape in cross section and opening toward each other in the joint, a solid hard metal ring of uniform cross section seated at longitudinally opposite sides in said recesses and extending between the surfaces in which said recesses are provided, said surfaces being axially spaced apart in the assembly and said ring being of substantial V-shape at its opposite longitudinal sides to accurately interfit with said recesses, means for drawing said members toward each other to contain the ring under pressure between them with said ring under heavy axial compression and with each V-shaped opposite side of said ring so tightly seated in its respective recess as to provide a metal to metal sealing fit and prevent displacement of said ring relative to said surfaces under the force of said axial compression, and means for limiting the pressure so applied to said ring to prevent crushing of the ring but permitting sufficiently high pressure to provide an operative metal to metal fluid tight seal comprising coacting annular abutments on said members distinct from said surfaces solidly engaged after predetermined relative movement of said members toward each other, said ring having the axis of compression through its cross section disposed at an acute angle with respect to the direction of application of said pressure.

2. In a plug valve assembly characterized by a body having a through passage for line fluid and a plug seating bore intersecting said passage, a ported plug rotatably mounted in said bore and adapted to turn to open or close said passage, an operating stem for said plug extending through said body at one end of the bore, a cover removably secured over the other end of said bore, and a flexible metal diaphragm extending over said cover within the bore, the improvement which comprises means providing a pressure tight joint between the cover and body comprising a body shoulder in said bore facing the cover, said shoulder and cover having axially spaced surfaces in the assembly, opposed annular recesses in the shoulder and cover surfaces and disposed radially outwardly of the opening of said bore at said shoulder, said flexible metal diaphragm extending over said cover recess, a solid hard metal ring of uniform cross section having its opposite sides disposed with radially confined interfit in said shoulder recess and upon said diaphragm in said cover recess and axially disposed between said cover and shoulder whereby said diaphragm is deflected into said cover recess and is there clamped between said ring and the cover, means for drawing said cover tight upon said body to axially compress said ring with the longitudinally opposite sides of said ring tight against the bottom of the shoulder recess and against the deflected diaphragm in the cover recess, and coacting annular faces on the body and cover distinct from said cover and body shoulder surfaces abutting to stop movement of the cover toward the body and prevent application of excessive axial pressure on said ring, said ring being axially confined between said cover and body shoulder with sufficient pressure to provide an operative fluid tight metal to metal seal when said faces abut.

3. In a plug valve assembly characterized by a metal body having a through passage for line fluid and a plug seating bore intersecting said passage, a ported plug rotatably mounted in said bore and adapted to turn to open or close said passage, an operating stem for the plug projecting through the body at one end of the bore, a relatively heavy metal cover extending over the other end of said bore, and a flexible metal diaphragm extending over said cover within the bore, the improvement which comprises means providing a fluid tight joint between the cover and body comprising a body shoulder surface in said bore adjacent and substantially axially facing an axially spaced cover surface, opposed annular recesses in said surfaces disposed radially outwardly of the opening of said bore to the body shoulder, said flexible metal diaphragm extending over said cover recess, a solid hard metal ring of uniform oblong cross section spacing said surfaces with opposite sides shaped to interfit with said recesses and disposed in said shoulder recess and upon said diaphragm in said cover recess whereby said diaphragm is deflected into said cover recess and clamped there between the ring and the cover, means for positively drawing said cover onto said body to close the bore, said ring being thereby axially compressed between the cover and body to provide respective metal to metal seals between said ring and said body and between said ring and said diaphragm, and coacting annular surfaces on said body and cover distinct from said axially facing body shoulder and cover surfaces abutting to prevent further pressure from being exerted axially on said ring after an operative fluid tight metal to metal seal has been established and before the ring has been crushed, the axis of compression through said oblong ring cross section being inclined at an acute angle with respect to the plug axis and said recesses being correspondingly located and disposed in the adjacent shoulder and cover surfaces.

References Cited in the file of this patent

UNITED STATES PATENTS

| | | |
|---|---|---|
| 1,483,499 | Allee | Feb. 12, 1924 |
| 1,825,962 | Laird | Oct. 6, 1931 |
| 1,821,863 | Wilson | Sept. 1, 1931 |
| 1,965,273 | Wilson | July 3, 1934 |
| 2,204,440 | Nordstrom | June 11, 1940 |
| 2,278,881 | Jacocks | Apr. 7, 1942 |
| 2,296,620 | Tinker | Sept. 22, 1942 |
| 2,461,041 | Donaldson | Feb. 8, 1949 |
| 2,584,161 | Scherer | Feb. 5, 1952 |
| 2,700,528 | Blackman | Jan. 25, 1955 |
| 2,845,085 | Robbins | July 29, 1958 |

FOREIGN PATENTS

| | | |
|---|---|---|
| 568,071 | Belgium | June 14, 1958 |